(12) United States Patent
Chen et al.

(10) Patent No.: US 9,432,117 B2
(45) Date of Patent: Aug. 30, 2016

(54) VISIBLE LIGHT COMMUNICATION APPARATUS AND METHOD OF VISIBLE LIGHT COMMUNICATION

(71) Applicant: Industrial Technology Research Institute, Hsinchu (TW)

(72) Inventors: Hsing-Yu Chen, Taipei (TW);
Yen-Liang Liu, Taipei (TW);
Chien-Hung Yeh, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 23 days.

(21) Appl. No.: 14/583,811

(22) Filed: Dec. 29, 2014

(65) Prior Publication Data
US 2016/0191156 A1    Jun. 30, 2016

(51) Int. Cl.
*H04B 10/00* (2013.01)
*H04B 10/116* (2013.01)

(52) U.S. Cl.
CPC .................................. *H04B 10/116* (2013.01)

(58) Field of Classification Search
USPC ........................................................ 398/172
See application file for complete search history.

(56) References Cited

U.S. PATENT DOCUMENTS

| 7,583,901 | B2 | 9/2009 | Nakagawa et al. | |
|---|---|---|---|---|
| 7,778,548 | B2* | 8/2010 | Yamamoto | H04B 10/1149 372/26 |
| 7,912,377 | B2 | 3/2011 | Koga | |
| 7,983,568 | B2* | 7/2011 | Won | H04B 10/1141 398/172 |
| 8,233,806 | B2* | 7/2012 | Kitaji | H04B 10/1149 398/118 |
| 8,358,935 | B2 | 1/2013 | Choi et al. | |
| 8,380,081 | B2* | 2/2013 | Kim | H04B 3/542 398/154 |
| 8,447,189 | B2* | 5/2013 | Kim | H04B 10/1149 398/136 |
| 8,521,034 | B2* | 8/2013 | Rajagopal | H04B 10/1149 398/172 |
| 8,554,084 | B2* | 10/2013 | Song | H04B 10/1149 398/118 |

(Continued)

FOREIGN PATENT DOCUMENTS

| CN | 102386969 | 3/2012 |
|---|---|---|
| CN | 103414514 | 11/2013 |
| TW | 201338444 | 9/2013 |

OTHER PUBLICATIONS

Christoph Kottke, et al., "Single-Channel Wireless Transmission at 806 Mbit/s Using a White-Light LED and a PIN-Based Receiver," 14th International Conference onTransparent Optical Networks (ICTON), Jul. 2-5 2012, pp. 1-4.

(Continued)

*Primary Examiner* — Agustin Bello
(74) *Attorney, Agent, or Firm* — Jianq Chyun IP Office (57) ABSTRACT

A visible light communication apparatus and a method for visible light communication are provided. The method includes calculating a quantity of terminals in coverage of each of a plurality of visible light sources. The visible light sources include a first visible light source and a second visible light source. Determining a quantity of the sub-bands according to the quantity of terminals. The sub-bands include a first sub-band and a second sub-band. Distributing the first sub-band for the first visible light source and the second sub-band for the second visible light source according to the quantity of terminals in coverage of each of the visible light sources, in which the first sub-band and the second sub-band are different from each other. Allocating a bandwidth for each of the terminals according to the distributed sub-bands or a user requirement. Modulating a transmission data on one of the first sub-band and the second sub-band.

14 Claims, 6 Drawing Sheets

(56) References Cited

U.S. PATENT DOCUMENTS

| | | | |
|---|---|---|---|
| 8,565,612 B2* | 10/2013 | Kim | H04W 72/048 |
| | | | 398/127 |
| 8,594,510 B2* | 11/2013 | Schenk | H05B 37/02 |
| | | | 315/152 |
| 8,605,822 B2 | 12/2013 | Lim | |
| 8,620,154 B2* | 12/2013 | Li | H04W 76/028 |
| | | | 398/1 |
| 8,639,124 B2* | 1/2014 | Castor | H04B 10/1149 |
| | | | 398/172 |
| 8,660,436 B2* | 2/2014 | Schenk | H05B 37/0272 |
| | | | 315/294 |
| 8,831,438 B2* | 9/2014 | Park | H04B 10/1141 |
| | | | 398/118 |
| 8,948,601 B2* | 2/2015 | Shar | H04B 10/1149 |
| | | | 398/129 |
| 9,031,416 B2* | 5/2015 | Son | H04B 10/1149 |
| | | | 398/127 |
| 2006/0067707 A1 | 3/2006 | Maniam et al. | |
| 2009/0180780 A1 | 7/2009 | Ann et al. | |
| 2011/0069957 A1* | 3/2011 | Kim | H04B 3/542 |
| | | | 398/75 |
| 2011/0091220 A1* | 4/2011 | Rajagopal | H04B 10/116 |
| | | | 398/172 |
| 2012/0001567 A1 | 1/2012 | Knapp et al. | |
| 2013/0028612 A1* | 1/2013 | Ryan | G01S 1/70 |
| | | | 398/172 |
| 2013/0202293 A1* | 8/2013 | Boyd | H04Q 11/0067 |
| | | | 398/38 |
| 2014/0056589 A1 | 2/2014 | Yeh et al. | |
| 2014/0270791 A1* | 9/2014 | Hyde | H04B 10/116 |
| | | | 398/118 |

OTHER PUBLICATIONS

Hoa Le Minh, et al., "High-Speed Visible Light Communications Using Multiple-Resonant Equalization," IEEE Photonics Technology Letters, vol. 20, No. 14, Jul. 15, 2008, pp. 1243-1245.

Yiguang Wang, et al., "Experimental demonstration of visible light communication based on sub-carrier multiplexing of Multiple-Input-Single-Output OFDM," 2012 17th Opto-Electronics and Communications Conference (OECC 2012), Jul. 2012, pp. 745-746.

Mohammed S. A., et al., "Practical OFDM Signalling for Visible Light Communications Using Spatial Summation," 27th Biennial Symposium on Communications (QBSC), Jun. 1-4 2014, pp. 5-9.

J. Vučić, et al., "Implementation of a Real-Time DMT-based 100 Mbit/s Visible-Light Link," 36th European Conference and Exhibition on Optical Communication (ECOC), Sep. 19-23, 2010, pp. 1-5.

Jelena Vučić, et al., "513 Mbit/s Visible Light Communications Link Based on DMT-Modulation of a White LED," Journal of Lightwave Technology, vol. 28, No. 24, Dec. 15, 2010, pp. 3512-3518.

* cited by examiner

VISIBLE LIGHT COMMUNICATION APPARATUS AND METHOD OF VISIBLE LIGHT COMMUNICATION

TECHNICAL FIELD

The disclosure relates to a visible light communication apparatus and a method of visible light communication.

BACKGROUND

Visible light communication (VLC) involves modulating information to be carried by a visible light used as a carrier. More specifically, visible light that is used to illuminate a location can be modulated with information so that electronic equipment under the coverage of visible light may receive information from the visible light that is modulated with information. A light-emitting diode (LED) can be used to provide the visible light. Since the original purpose of light is to illuminate a location, and visible lights are pervasive, using visible light to communicate may not significantly require alternations of existing infrastructures. VLC has the advantages of having secure communication channels, being relatively immune to interference relative to other forms of communications and also is currently not known to cause electromagnetic injuries.

Multi-band orthogonal frequency-division multiplexing (OFDM) used in modulating different light-emitting diodes (LEDs) in VLC may reduce non-linear distortions and may increase transmission rates. However, conventional VLC techniques achieve an increase of transmission rates only in the overlapping regions of the light sources, while other regions achieve low transmission rate. Moreover, conventional schemes that perform optimization of the LED driving circuit and the receiving end circuit have limited effects due to the limited response and output power of the LED light sources. Other schemes attempt to add blue filters in the receiving end, but these techniques may drastically increase the cost of the receiving modules by adding optical filters. Wavelength division multiplexing (WDM) transmission techniques, on the other hand, require costly RGB light sources and wavelength selection filters in the receiving end.

Therefore, the disclosure provides a VLC apparatus and a method of VLC that would improve upon conventional schemes.

SUMMARY

The disclosure proposes a visible light communication (VLC) apparatus and a method of visible light communication.

In one of the exemplary embodiments, the disclosure provides a VLC apparatus that includes at least but not limited to a plurality of visible light sources and a controller. The controller is coupled to the visible light sources and configured for determining a quantity of a plurality of sub-bands according to a quantity of terminals in coverage of each of the visible light sources. The sub-bands include a first sub-band and a second sub-band. The visible light sources include a first visible light source and a second visible light source. The first visible light source uses the first sub-band. The second visible light source uses the second sub-band. The first sub-band and the second sub-band are different from each other. The controller receives a transmission data. The controller, the first visible light source or the second visible light source modulate the transmission data on one of the first sub-band and the second sub-band.

In one of the exemplary embodiments, the disclosure provides a method of visible light communication that includes calculating a quantity of terminals in coverage of each of a plurality of visible light sources, where the visible light sources include a first visible light source and a second visible light source; determining a quantity of sub-bands according to the quantity of terminals, wherein the sub-bands include a first sub-band and a second sub-band; distributing the first sub-band for the first visible light source and the second sub-band for the second visible light source according to the quantity of the terminals in coverage of each of the visible light sources, wherein the first sub-band and the second sub-band are different from each other; allocating a bandwidth for each of the terminals according to the distributed sub-bands or a user requirement; and modulating a transmission data on one of the first sub-band and the second sub-band.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
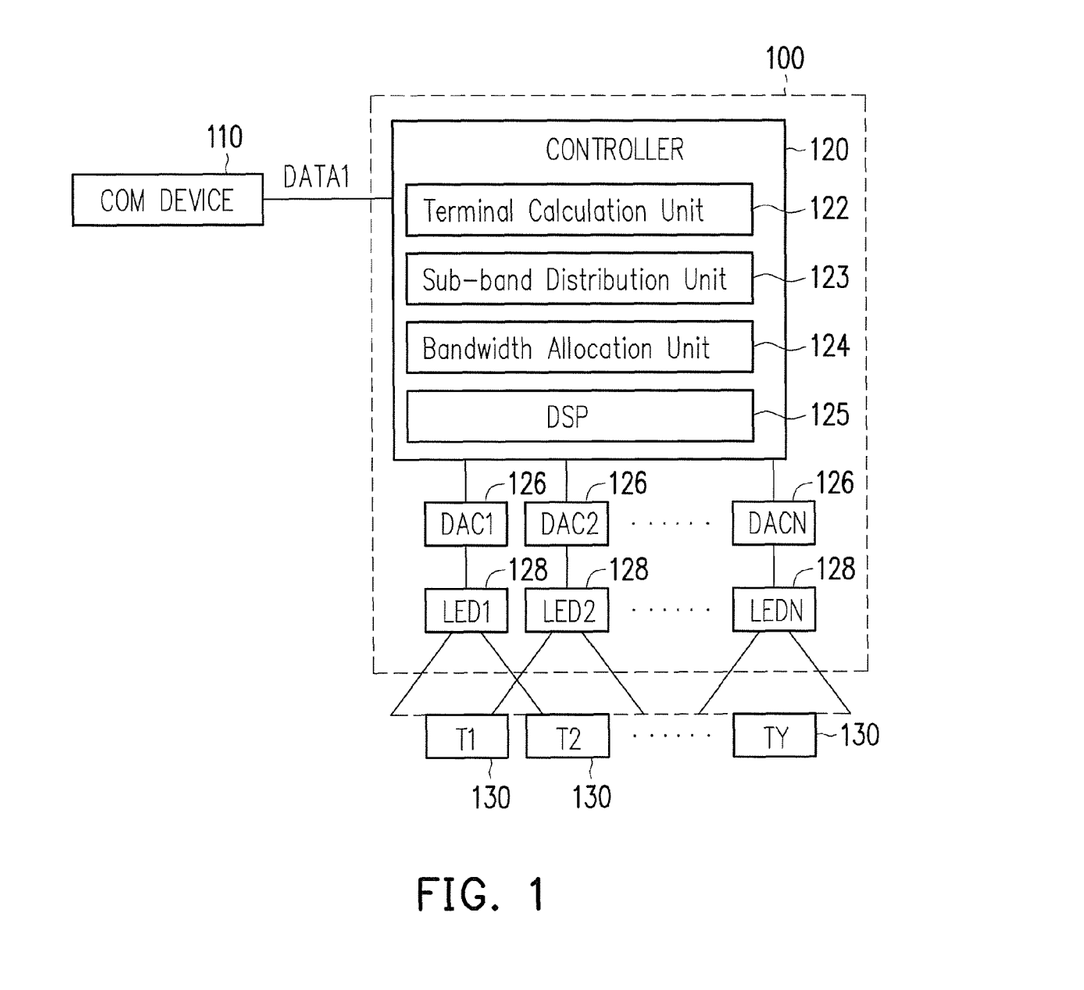
FIG. 1 is a schematic view of a visible light communication (VLC) apparatus according to an exemplary embodiment.

FIG. 1 is a schematic view of a visible light communication (VLC) apparatus according to an exemplary embodiment. With reference to FIG. 1, a VLC apparatus 100 includes a controller 120 and a plurality of visible light sources, such as the light-emitting diode (LED) light sources LED1, LED2, . . . , LEDN 128. In the present embodiment, the controller 120 is coupled to the LED light sources 128 through the DACs 126, and the controller 120 receives a transmission data DATA1 from a communication device 110, which may be a server device of any type known in the art which sends the transmission data DATA1 to the VLC apparatus 100. The LED light sources 128 may be assigned to different sub-bands according to the quantity of terminals. For example, LED1 is assigned to first sub-band and LED2 is assigned to second sub-band. The first sub-band and the second sub-band may be visible light bands, for instance, and the first sub-band and the second sub-band may be different from each other. The controller 120 may be configured for modulating the transmission data DATA1 on one of the first sub-band and the second sub-band according to a quantity of terminals T1, T2, . . . , TY 130 in coverage of each of the LED light sources 128. However, in another embodiment, the controller 120 may also be configured for modulating the transmission data DATA1 on the other one of the first sub-band and the second sub-band. In still another embodiment, the controller 120 may be configured for modulating the transmission data DATA1 on the first sub-band and the second sub-band. In one embodiment, the sub-bands may be visible light bands that do not overlap each other.

In the present embodiment, the controller 120 includes a terminal calculation unit 122, a sub-band distribution unit 123, a bandwidth allocation unit 124, and a digital signal processor (DSP) 125. However, it should be noted that the controller 120 is not limited to the elements described. For example, the DSP 125 may also be replaced by a processor or a circuit. The terminal calculation unit 122 is configured for calculating the quantity of ten finals T1, T2, . . . , TY 130 in coverage of each of the LED light sources 128. The sub-band distribution unit 123 is configured for determining a quantity of sub-bands according to the quantity of terminals. Moreover, in some embodiments, the sub-band distribution unit 123 is further configured for distributing the sub-bands for each of the LED light sources 128 according to the quantity of terminals 130 in coverage of each of the LED light sources 128. In the present embodiment, the bandwidth allocation unit 124 is configured for allocating a bandwidth for each of the terminals 130 according to the sub-bands distributed by the sub-band distribution unit 123. In some embodiments, a signal quality (e.g., data rate) of each of the distributed sub-bands may be determined by the quantity of terminals 130 in coverage of each of the LED light sources 128.

In the present embodiment, the controller 120 may further include a digital signal processor (DSP) 125 configured for modulating the transmission data DATA1 on the sub-bands (so-called modulation function) according to the quantity of sub-bands and the bandwidth. In some embodiments, the VLC apparatus 100 may further include a plurality of digital-to-analog converters (DACs) DAC1, DAC2, . . . , DACN 126 coupled between the controller 120 and the LED light sources 128. The DACs 126 may convert the modulated transmission data DATA1 into a plurality of analog signals for driving the LED light sources 128. In some embodiments, a quantity of the DACs 126 in use is related to the quantity of sub-bands determined by the sub-band distribution unit 123. Moreover, the controller 120 may disable each of the DACs 126 corresponding to each of the LED light sources 128 with no terminals 130 in coverage. In some embodiments, a quantity of the DACs 126 may determine a maximum quantity of sub-bands.

Figure 2:
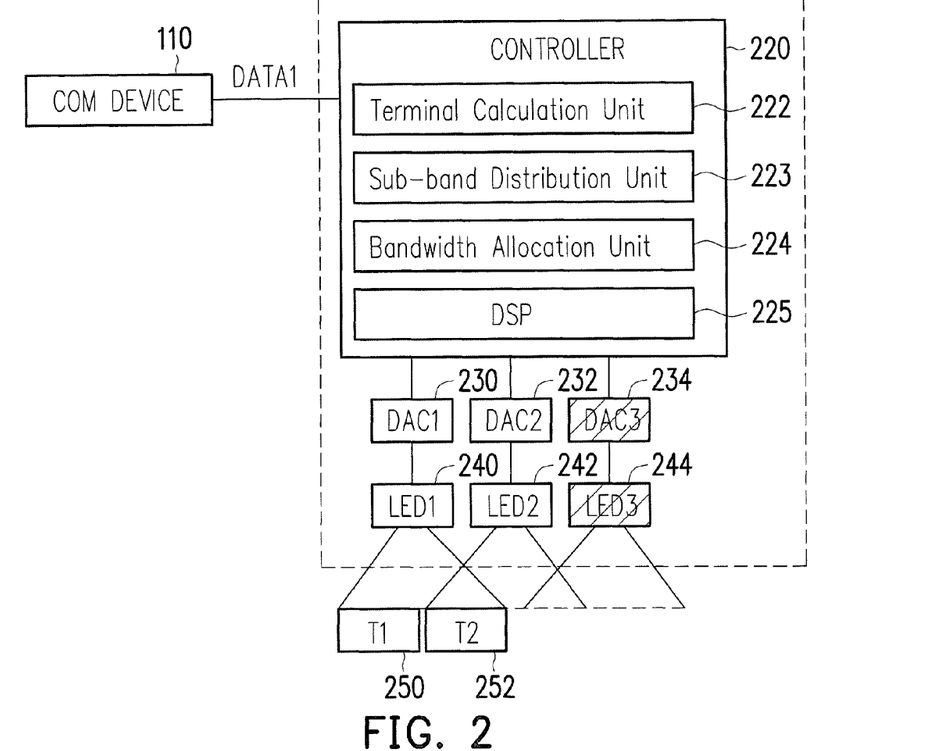
FIG. 2 is a schematic view of a VLC apparatus according to an exemplary embodiment.
Figure 3:
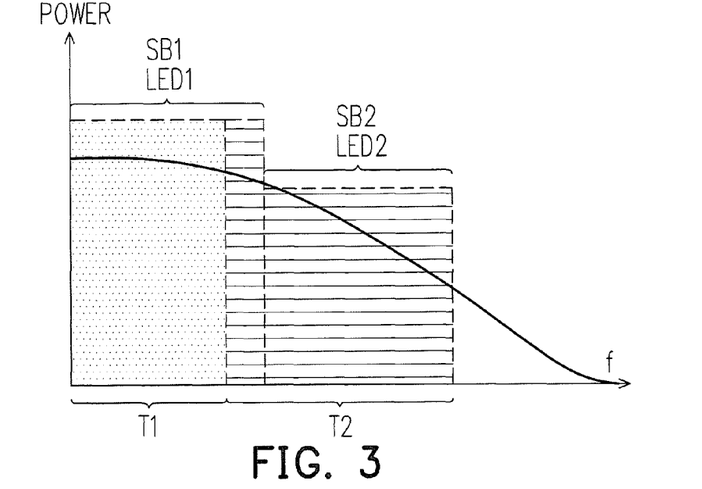
FIG. 3 is a power versus frequency diagram illustrating the sub-bands of the VLC apparatus depicted in FIG. 2.

In order to better illustrate the principles of the disclosure, several embodiments are presented hereafter with reference to the drawings. FIG. 2 is a schematic view of a VLC apparatus according to an exemplary embodiment, and FIG. 3 is a power versus frequency diagram illustrating the sub-bands of the VLC apparatus depicted in FIG. 2. With reference to FIG. 2 and FIG. 3, in the present embodiment, a VLC apparatus 200 is similar to the VLC apparatus 100 depicted in FIG. 1. A difference between the VLC apparatus 200 and the VLC apparatus 100 is that, the VLC apparatus 200 has a first LED light source 240, a second LED light source 242, a third LED light source 244, and the first DAC 230, second DAC 232, and third DAC 234 respectively corresponding to the first LED light source 240, the second LED light source 242, and the third LED light source 244. The third DAC 234 and the modulation function of the third LED light source 244 are put in sleep mode since no terminals are in coverage. It should be noted that, the modulation function may be implemented by different elements in the VLC apparatus 200. In some embodiments, the modulation function may be implemented by the DSP 225 in the controller 220, and therefore the modulation function implemented by the DSP 225 is placed in sleep mode. In other embodiments, the modulation function may be implemented in the first LED light source 240, the second LED light source 242, and the third LED light source 244, and therefore the modulation function in the LED light sources are turned off. In the present embodiment, the controller 220 receives the transmission data DATA1 from the communication device 110 to enable VLC transmission in a multi-band OFDM framework. The terminal calculation unit 222 calculates that the first LED light source 240 has two terminals in coverage (e.g., a first terminal 250 and a second terminal 252), the second LED light source 242 has one terminal in coverage (e.g., the second terminal 252), and the third LED light source 244 has no terminals in coverage. According to the number of terminals (e.g., two LED light sources have terminals in coverage); the sub-band distribution unit 223 determines the number of sub-bands (e.g., two sub-bands SB1 and SB2) for the first LED light source 240 and the second LED light source 242.

In some embodiments, since the third LED light source 244 has no terminals in coverage, the sub-band distribution unit 223 may also enable a sleep mode for the third DAC 234 and the signal modulation function of the third LED 244, as indicated by the slash lines over the third DAC 234 and the third LED light source 244 depicted in FIG. 2. By putting the third DAC 234 and the signal modulation function of the third LED light source 244 into sleep mode, power consumption is conserved for the VLC apparatus 200. The sub-band distribution unit 223 is further configured for distributing the sub-bands SB1 and SB2 for each of the LED light sources 240 and 242 according to the quantity of terminals 250 and 252 in coverage of the LED light sources 240 and 242. That is, as shown in FIG. 2, since first LED light source 240 has both the first terminal 250 and the second terminal 252 in coverage, the sub-band distribution unit 223 assigns a first sub-band SB1 for the first LED light source 240. Moreover, since the second light source LED 242 has only the second terminal 252 in coverage, the sub-band distribution unit 223 assigns a second sub-band SB2 for the second LED light source 242. In the present embodiment, the first sub-band SB1 may be assigned with a higher data rate compared to the second sub-band SB2 according to the number of terminals in coverage of the first LED light source 240 and in coverage of the second LED light source 242, as shown in FIG. 3. That is, since the number of terminals in coverage of the first LED light source 240 is greater than the number of terminals in coverage of the second LED light source 242, the first sub-band SB1 may have a higher data rate than the second sub-band SB2. The bandwidth allocation unit 224 allocates a bandwidth for each of the terminals T1 and T2 according to the sub-bands SB1 and SB2 distributed by the sub-band distribution unit 223. As shown in FIG. 3, the first terminal T1 receives a portion of the bandwidth of the first sub-band SB1 (e.g., depicted as dotted area), whereas the second terminal T2 receives a portion of the bandwidths of both the first sub-band SB1 and the second sub-band SB2 (e.g., depicted as horizontal line area), since the second terminal T2 receives signals from both the first LED light source 240 and the second LED light source 242.

The controller 220 may further include a DSP 225 configured for modulating the transmission data DATA1 on the sub-bands of the LED light sources 240 and 242 according to the quantity of sub-bands SB1 and SB2 and the bandwidth. In some embodiments, the first DAC 230 and the second DAC 232 may convert the modulated transmission data DATA1 into a plurality of analog signals for driving the first and second LED light sources 240 and 242. As shown in FIG. 2 and FIG. 3, the number of the digital-to-analog converters used in the VLC apparatus 200 is related to the quantity of sub-bands SB1 and SB2 determined by the sub-band distribution unit 223, and by putting the third DAC3 234 and the modulation function of the third LED light source 244 in sleep mode, the VLC apparatus 200 is able to conserve power. Moreover, by using the multi-band OFDM framework shown in FIG. 2, transmission capacity of the VLC apparatus 200 can be enhanced, and each terminal can receive an equal transmission capacity. Therefore, the VLC apparatus 200 can overcome the uneven transmission capacity issue of the conventional VLC device. In addition, the framework of the VLC apparatus 200 only requires additional functional units in the controller 220, and the number of DACs can be added to increase the maximum number of sub-bands. These attributes allow the VLC apparatus 200 to dynamically allocate resources. No additional cost is necessary on the receiving end, since the receiving terminals perceive the received signals as a single band during demodulation.

Figure 4:
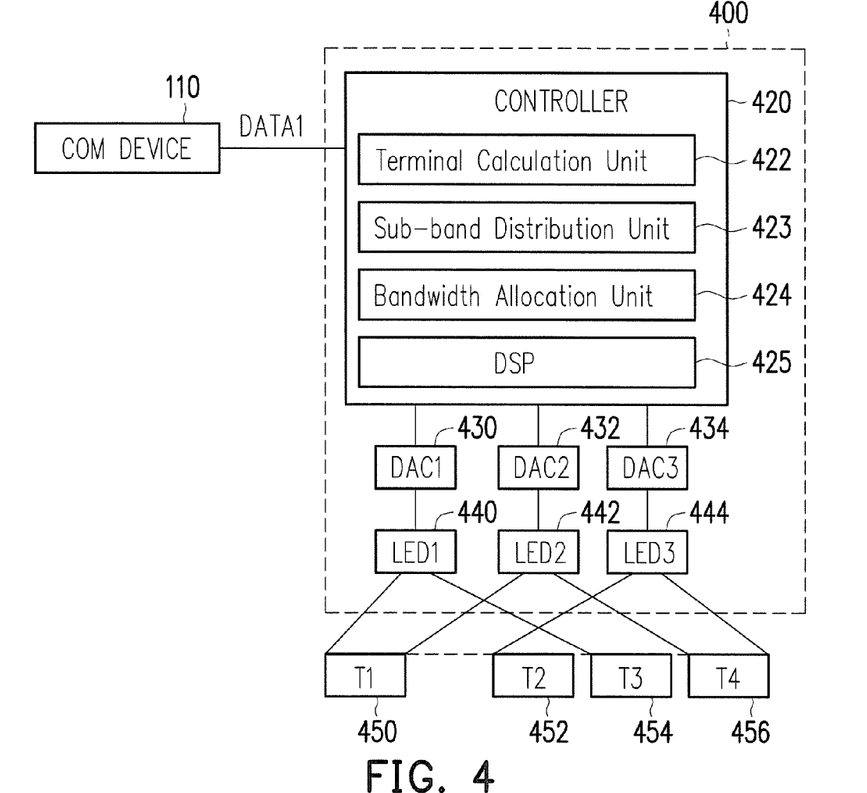
FIG. 4 is a schematic view of a VLC apparatus according to an exemplary embodiment.
Figure 5:
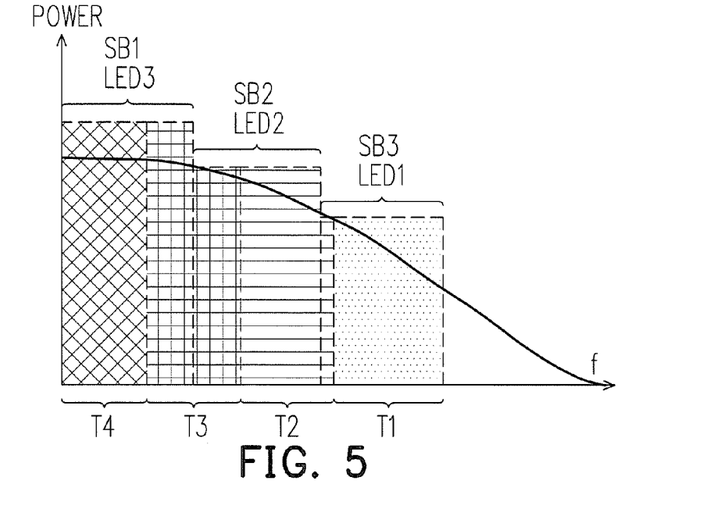
FIG. 5 is a power versus frequency diagram illustrating the sub-bands of the VLC apparatus depicted in FIG. 4.

FIG. 4 is a schematic view of a VLC apparatus according to an exemplary embodiment, and FIG. 5 is a power versus frequency diagram illustrating the sub-bands of the VLC apparatus depicted in FIG. 4. With reference to FIG. 4 and FIG. 5, in the present embodiment, a VLC apparatus 400 is similar to the VLC apparatus 200 depicted in FIG. 2. A difference between the VLC apparatus 400 and the VLC apparatus 200 is that, the VLC apparatus 400 has a first LED light source 440, a second LED light source 442, a third LED light source 444, and the first DAC 430, second DAC 432, and third DAC 434 respectively corresponding to the first LED light source 440, the second LED light source 442, and the third LED light source 444. In the present embodiment, the controller 420 receives the transmission data DATA1 from the communication device 110 to enable VLC transmission in a multi-band OFDM framework. The terminal calculation unit 422 calculates that the first LED light source 440 has two terminals in coverage (a first terminal 450 and a second terminal 452), the second LED light source 442 has two terminals in coverage (e.g., the second terminal 452 and a third terminal 454), and the third LED light source 444 has three terminals in coverage (e.g., the second terminal 452, the third terminal 454, and a fourth terminal 456). According to the number of terminals (e.g., three LED light sources have terminals in coverage), the sub-band distribution unit 423 determines the number of sub-bands (e.g., three sub-bands SB1, SB2, and SB3) for the sub-bands of the first LED light source 440, the second LED light source 442, and the third LED light source 444.

The sub-band distribution unit 223 is further configured for distributing the sub-bands SB1, SB2, and SB3 for each of the LED light sources 440, 442, and 444 according to the quantity of terminals 450, 452, 454, and 456 in coverage of the LED light sources 440, 442, and 444. That is, as shown in FIG. 4, since third LED light source 444 has the most terminals in coverage (e.g., the second terminal 452, the third terminal 454, and the fourth terminal 456), the sub-band distribution unit 423 assigns the first sub-band SB1 to the third LED light source 444. Both the first LED light source 440 and the second LED light source 442 have two terminals in coverage, and therefore the sub-band distribution unit 423 assigns the second sub-band SB2 to the second LED light source 442 since it is closer to the populated region of terminals (e.g., region of terminals 452, 454, and 456). Accordingly, the sub-band distribution unit 423 assigns the third sub-band SB3 to the first LED light source 440. In the present embodiment, as shown in FIG. 5, the first sub-band SB1 has the highest data rate, the third sub-band SB3 has the lowest data rate, and the second sub-band SB2 has a data rate in between the first sub-band SB1 and the third sub-band SB3. The sub-band distribution unit 423 assigns the first sub-band SB1 to the third LED light source 444. The bandwidth allocation unit 424 allocates a bandwidth for each of the terminals 450, 452, 454, and 456 according to the sub-bands SB1, SB2, and SB3 distributed by the sub-band distribution unit 423. As shown in FIG. 5, the first terminal 450 receives a portion of the bandwidth of the third sub-band SB3 (e.g., depicted as dotted area), the second terminal 452 receives a portion of the bandwidths of the sub-bands SB2 and SB3 (e.g., depicted as horizontal line area), the third terminal 454 receives a portion of the bandwidths of the sub-bands SB1 and SB2 (e.g., depicted as the straight cross pattern area), and the fourth terminal 456 receives a portion of the bandwidth of the first sub-band SB1 (e.g., depicted as the diagonal cross pattern area). In another embodiment, the second terminal 452 may receive a portion of the bandwidths of the sub-bands SB1, SB2 and SB3. It should be noted that, the bandwidth allocation unit 424 may also allocate bandwidths to the terminals 450, 452, 454, and 456 in accordance to user requirements, or the bandwidth allocation may be evenly distributed among the four terminals, although the disclosure is not limited thereto.

The controller 420 may further include a DSP 425 configured for modulating the transmission data DATA1 on the sub-bands of the LED light sources 440, 442, and 444 according to the quantity of sub-bands SB1, SB2, and SB3 and the bandwidth. In some embodiments, the DACs 430, 432, and 434 may convert the modulated transmission data DATA1 into a plurality of analog signals for driving the LED light sources 440, 442, and 444. As shown in FIG. 4 and FIG. 5, the number of the digital-to-analog converters used in the VLC apparatus 400 is related to the quantity of sub-bands SB1, SB2, and SB3 determined by the sub-band distribution unit 423. Similar to the VLC apparatus 200 of FIG. 2, by using the multi-band OFDM framework shown in FIG. 4, transmission capacity of the VLC apparatus 400 can be enhanced, and each terminal can receive sufficient transmission capacity. Therefore, the VLC apparatus 400 can also overcome the uneven transmission capacity issue of the conventional VLC device. In addition, the framework of the VLC apparatus 400 only requires additional functional units in the controller 420, and the number of DACs can be added to increase the maximum number of sub-bands. These attributes also allow the VLC apparatus 400 to dynamically allocate resources. No additional cost is necessary on the receiving end, since the receiving terminals perceive the received signals as a single sub-band during demodulation.

Figure 6:
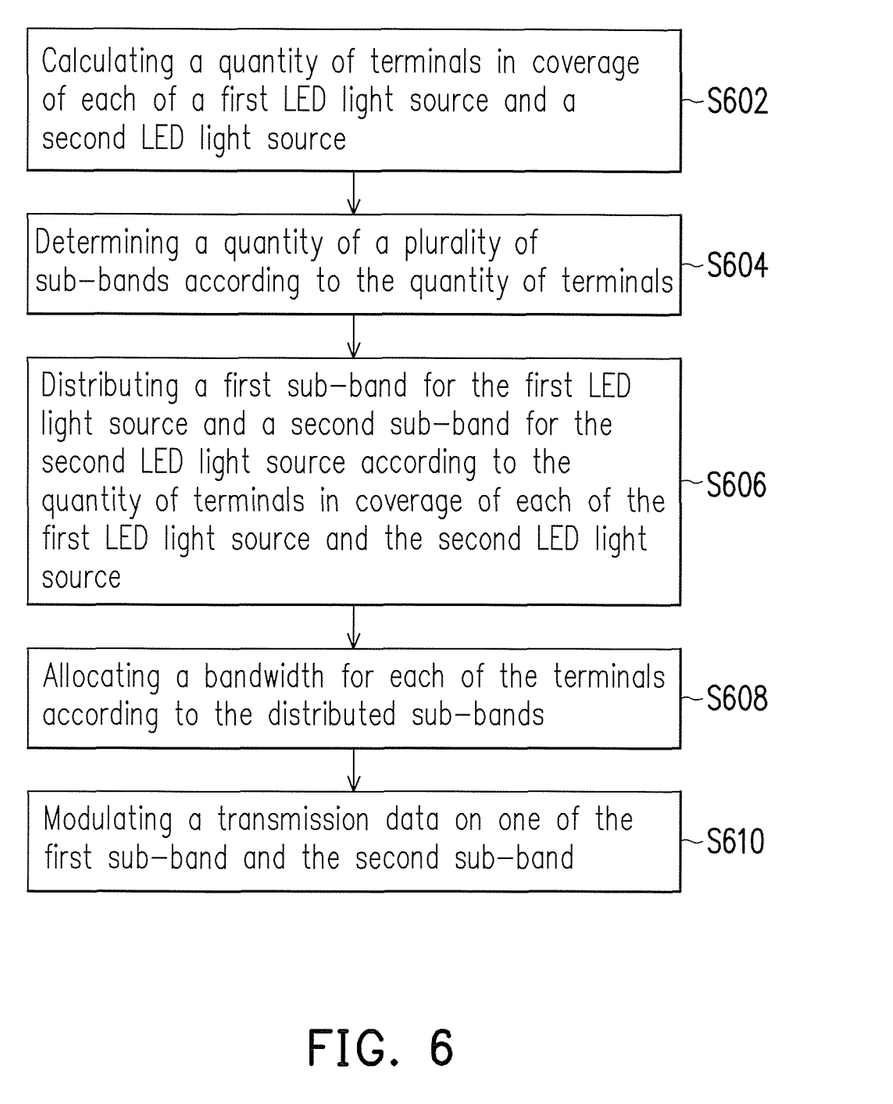
FIG. 6 is a flow diagram of a method for visible light communication according to an exemplary embodiment.

With the foregoing description of the VLC apparatus 200 and the VLC apparatus 400, a method for visible light communication can also be described. FIG. 6 is a flow diagram of a method for visible light communication according to an exemplary embodiment. In Step S602, a quantity of terminals in coverage of each of a first LED light source and a second LED light source is calculated. In Step S604, a quantity of the sub-bands is determined according to the quantity of terminals. In Step S606, a first sub-band is distributed for the first LED light source and a second sub-band is distributed for the second LED light source according to the quantity of terminals in coverage of each of the first LED light source and the second LED light source. The first sub-band and the second sub-band are different from each other. In Step S608, a bandwidth for each of the terminals is allocated according to the distributed sub-bands. In Step S610, in the present embodiment, a transmission data is modulated on one of the first sub-band and the second sub-band. In another embodiment, the transmission data may be modulated on the other one of the first sub-band and the second sub-band. In still another embodiment, the transmission data may be modulated on the first sub-band and the second sub-band. In some embodiments, a signal quality of each of the distributed sub-bands is determined by the quantity of terminals in coverage of each of the first LED light source and the second LED light source. In other embodiments, a DSP is configured for modulating the transmission data according to the quantity of sub-bands and the bandwidth. In some embodiments, a plurality of DACs are configured between the controller and the first LED light source and the second LED light source. The DACs convert the modulated transmission data into a plurality of analog signals for driving the first LED light source and the second LED light source, in which a quantity of the digital-to-analog converters is related to the quantity of sub-bands. In other embodiments, a signal quality of each of the distributed sub-bands is determined by the quantity of terminals in coverage of each of the first LED light source and the second LED light source. In other embodiments, a sleep mode is enabled for each of the digital-to-analog converters corresponding to each of the LED light sources with no terminals in coverage. In some embodiments, a sleep mode is enabled for a modulation function of each of the LED light sources with no terminals in coverage.

Figure 7:
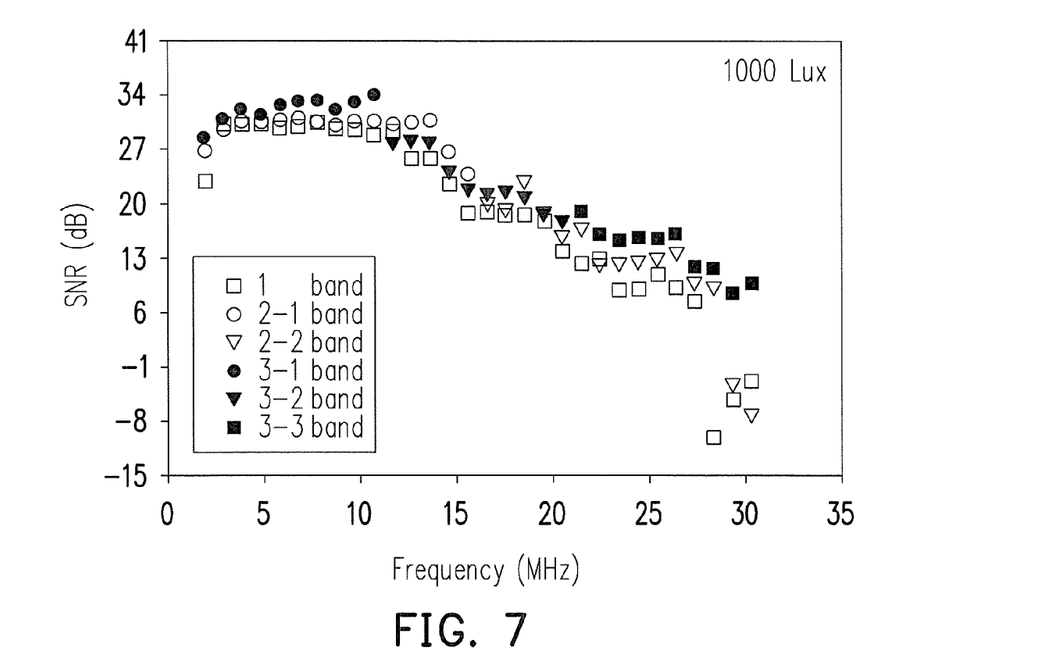
FIG. 7 is a SNR versus frequency diagram of an experimental result of a visible light apparatus according to an exemplary embodiment.
Figure 8:
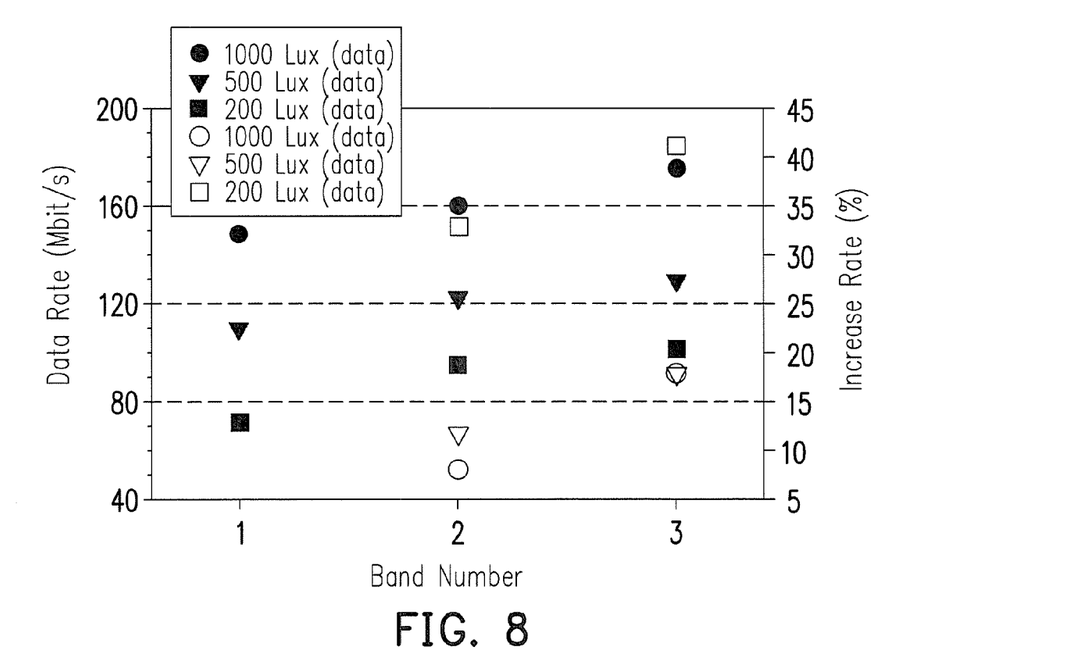
FIG. 8 is a data rate increase versus sub-band diagram of an experimental result of a visible light apparatus according to an exemplary embodiment.
Figure 9:
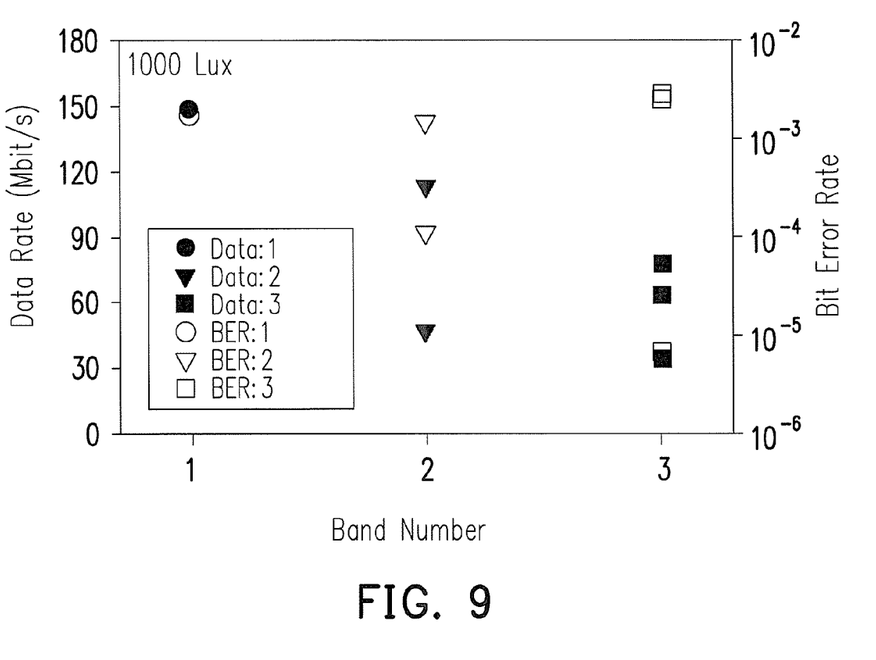
FIG. 9 is a bit error rate versus sub-band diagram of an experimental result of a visible light apparatus according to an exemplary embodiment.

FIG. 7 is a SNR versus frequency diagram of an experimental result of a visible light apparatus according to an exemplary embodiment. FIG. 8 is a data rate increase versus sub-band diagram of an experimental result of a visible light apparatus according to an exemplary embodiment. FIG. 9 is a bit error rate versus sub-band diagram of an experimental result of a visible light apparatus according to an exemplary embodiment. As shown in the experimental result of FIG. 7, as the number of sub-bands becomes greater, the SNR of the OFDM subcarriers also increase. A reason for this phenomenon is due to the low peak-to-average power ratio (PAPR) of the sub-bands, modulation energy can be increased, and therefore the receiving end can obtain large reception signals and preferable SNR can be obtained. The experimental result of FIG. 8 compares the data rate and data rate increase of different sub-band numbers under different light intensity. In FIG. 9, the experimental result compares the data rate and bit error rate of different sub-band numbers. As shown in FIG. 9, the data rate of a single band is greater than the data rates of other quantities of sub-bands. However, although the data rate of each respective sub-band may be lower than the single band, it should be noted that a sum of the data rates of multiple sub-bands is greater than the data rate of the single band. Moreover, due to different frequency response of the sub-bands at different sub-bands, the data rates of the sub-bands are different from each other. Therefore, the experimental result of FIG. 9 shows that preferable visible light communication requires a robust mechanism to allocate transmission capacity and resources.

In view of the foregoing, by adopting the visible light communication apparatus and method for visible light communication of an exemplary embodiment, multi-band OFDM modulation can be achieved, transmission capacity of the VLC apparatus can be enhanced, and each user terminal can receive sufficient transmission capacity. The VLC apparatus can also overcome the uneven transmission capacity issue of the conventional VLC device. In addition, the framework of the VLC apparatus and method only requires additional functional units in the controller, and the number of DACs can be added according to the number of sub-bands. These attributes also allow the VLC apparatus and method to reduce the time to calculate the receiving terminals and to dynamically allocate resources. No additional cost is necessary on the receiving end, since the receiving terminals perceive the received signals as a single band during demodulation.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:
1. A visible light communication apparatus, comprising:
a plurality of visible light sources;
a controller coupled to the visible light sources, the controller is configured for determining a quantity of a plurality of sub-bands according to a quantity of ter- minals in coverage of each of the visible light sources, wherein the sub-bands comprise a first sub-band and a second sub-band, wherein the visible light sources comprise:
- a first visible light source configured to use the first sub-band;
- a second visible light source configured to use the second sub-band, and the first sub-band and the second sub-band are different from each other; and wherein the controller is configured to receive a transmission data, and the controller, the first visible light source or the second visible light source modulate the transmission data on one of the first sub-band and the second sub-band; and a plurality of digital-to-analog converters coupled between the controller and the corresponding visible light sources, the digital-to-analog converters converting the modulated transmission data into a plurality of analog signals for driving the visible light sources, wherein the controller enables a sleep mode for each of the digital-to-analog converters corresponding to each of the visible light sources with no terminals in coverage.

2. The visible light communication apparatus according to claim 1, wherein the controller comprises:
- a terminal calculation unit configured for calculating a quantity of terminals in coverage of each of the visible light sources;
- a sub-band distribution unit configured for determining the quantity of sub-bands according to the quantity of terminals, and distributing the first sub-band for the first visible light source and the second sub-band for the second visible light source according to the quantity of terminals; and
- a bandwidth allocation unit configured for allocating a bandwidth for each of the terminals according to the sub-bands or a user requirement.

3. The visible light communication apparatus according to claim 1, wherein a signal quality of each of the distributed sub-bands is determined by the quantity of terminals in coverage of each of the visible light sources.

4. The visible light communication apparatus according to claim 2, the controller further comprising:
- a digital signal processor (DSP) configured for modulating the transmission data on the one of the first sub-band and the second sub-band according to the quantity of sub-bands and the bandwidth.

5. The visible light communication apparatus according to claim 1, wherein the controller sets a corresponding modulation function to a sleep mode for each of the visible light sources with no terminals in coverage, wherein the modulation function is configured for modulating the transmission data on the sub-bands.

6. The visible light communication apparatus according to claim 1, wherein the visible light sources further comprise a third visible light source, the sub-bands further comprise a third sub-band, and the third visible light source is configured to use the third sub-band, wherein the first sub-band, the second sub-band, and the third sub-band are different from each other.

7. The visible light communication apparatus according to claim 1, wherein the controller is configured for modulating the transmission data on the first sub-band and the second sub-band.

8. A method for visible light communication, comprising:
- calculating a quantity of terminals in coverage of each of a plurality of visible light sources, wherein the visible light sources comprise a first visible light source and a second visible light source;
- determining a quantity of sub-bands according to the quantity of terminals, wherein the sub-bands comprise a first sub-band and a second sub-band;
- distributing the first sub-band for the first visible light source and the second sub-band for the second visible light source according to the quantity of the terminals in coverage of each of the visible light sources, wherein the first sub-band and the second sub-band are different from each other;
- allocating a bandwidth for each of the terminals according to the distributed sub-bands or a user requirement;
- modulating a transmission data on one of the first sub-band and the second sub-band; and
- converting the modulated transmission data into a plurality of analog signals by a plurality of digital-to-analog converters for driving the visible light sources, wherein a sleep mode is enabled for each of the digital-to-analog converters corresponding to each of the visible light sources with no terminals in coverage.

9. The method for visible light communication according to claim 8, wherein a signal quality of each of the distributed sub-bands is determined by the quantity of terminals in coverage of each of the visible light sources.

10. The method for visible light communication according to claim 8, wherein the operation of modulating a transmission data on one of the first sub-band and the second sub-band comprises:
- modulating the transmission data on one of the first sub-band and the second sub-band by a digital signal processor (DSP) according to the quantity of sub-bands and the bandwidth.

11. The method for visible light communication according to claim 8, wherein a corresponding modulation function is set to a sleep mode for each of the visible light sources with no terminals in coverage, wherein the modulation function is configured for modulating the transmission data on the sub-bands.

12. The method for visible light communication according to claim 8, wherein the visible light sources further comprise a third visible light source, the sub-bands further comprise a third sub-band, and the method for visible light communication further comprises: distributing a third sub-band for a third visible light source, wherein the first sub-band, the second sub-band, and the third sub-band are different from each other.

13. The method for visible light communication according to claim 8, wherein the transmission data is modulated on the first sub-band and the second sub-band.

14. The visible light communication apparatus according to claim 5, wherein the controller comprises a sub-band distribution unit, the sub-band distribution unit sets the corresponding modulation function to the sleep mode for each of the visible light sources with no terminals in coverage.

* * * * *